(12) United States Patent
Weggenmann et al.

(10) Patent No.: US 12,437,105 B2
(45) Date of Patent: Oct. 7, 2025

(54) DATA OBSCURING FOR NATURAL LANGUAGE TEXT

(71) Applicant: SAP SE, Walldorf (DE)

(72) Inventors: Benjamin Weggenmann, Karlsruhe (DE); Valentin Rublack, Cologne (DE)

(73) Assignee: SAP SE, Walldorf (DE)

( * ) Notice: Subject to any disclaimer, the term of this patent is extended or adjusted under 35 U.S.C. 154(b) by 388 days.

(21) Appl. No.: 17/985,217

(22) Filed: Nov. 11, 2022

(65) Prior Publication Data

US 2024/0160772 A1   May 16, 2024

(51) Int. Cl.
*G06F 21/62* (2013.01)
*G06F 40/284* (2020.01)

(52) U.S. Cl.
CPC ........ *G06F 21/6245* (2013.01); *G06F 40/284* (2020.01)

(58) Field of Classification Search
CPC .......................... G06F 21/6245; G06F 40/284
See application file for complete search history.

(56) References Cited

U.S. PATENT DOCUMENTS

| | | | |
|---|---|---|---|
| 9,159,024 B2 | 10/2015 | Bhanot et al. | |
| 9,646,041 B2 | 5/2017 | Foebel et al. | |
| 12,086,047 B2 | 9/2024 | Sinha et al. | |
| 12,235,990 B2 | 2/2025 | Haerterich et al. | |
| 2010/0074437 A1 | 3/2010 | Inami et al. | |
| 2010/0091337 A1 | 4/2010 | Yoshio et al. | |
| 2017/0250959 A1* | 8/2017 | Gordon | G06N 20/00 |
| 2018/0336463 A1 | 11/2018 | Bloom | |
| 2020/0020098 A1 | 1/2020 | Odry et al. | |
| 2020/0082916 A1 | 3/2020 | Polykovskiy et al. | |
| 2020/0366914 A1 | 11/2020 | Schroers et al. | |
| 2021/0150305 A1 | 5/2021 | Amiri et al. | |
| 2021/0192650 A1 | 6/2021 | Hunn et al. | |
| 2021/0276547 A1 | 9/2021 | Narayanan et al. | |

(Continued)

OTHER PUBLICATIONS

"U.S. Appl. No. 17/010,501, Examiner Interview Summary mailed Sep. 19, 2024", 2 pgs.

(Continued)

*Primary Examiner* — Taghi T Arani
*Assistant Examiner* — Edward Estrada
(74) *Attorney, Agent, or Firm* — SCHWEGMAN LUNDBERG & WOESSNER, P.A.

(57) ABSTRACT

Various examples are directed to systems and methods for obscuring natural language data. A programmed computer may access natural language data comprising a first plurality of sequenced tokens. The programmed computer may apply an encoder model to the first plurality of sequenced tokens to generate a latent space representation of the first plurality of sequenced tokens, the latent space representation comprising a first content latent vector describing a content of the natural language data and a first author latent vector describing an author of the natural language data. The programmed computer may modify the first author latent vector to generate an obscured author latent vector. The programmed computer may apply a decoder model to the first content latent vector and the obscured author latent vector to generate obscured natural language data, the obscured natural language data comprising a second plurality of tokens.

20 Claims, 8 Drawing Sheets

(56) References Cited

U.S. PATENT DOCUMENTS

| | | | |
|---|---|---|---|
| 2021/0342546 A1* | 11/2021 | Beigi | G06F 21/6245 |
| 2022/0070150 A1* | 3/2022 | Haerterich | G06N 3/045 |
| 2022/0084173 A1 | 3/2022 | Liang et al. | |
| 2022/0101096 A1 | 3/2022 | Singer et al. | |
| 2022/0172050 A1 | 6/2022 | Dalli et al. | |
| 2023/0038935 A1 | 2/2023 | Kothari et al. | |
| 2023/0197289 A1 | 6/2023 | Delaubenfels et al. | |
| 2023/0222176 A1 | 7/2023 | Honke et al. | |
| 2023/0350776 A1 | 11/2023 | Sinha et al. | |
| 2023/0376626 A1 | 11/2023 | Haerterich et al. | |

OTHER PUBLICATIONS

"U.S. Appl. No. 17/010,501, Final Office Action mailed Oct. 2, 2023", 33 pgs.

"U.S. Appl. No. 17/010,501, Final Office Action mailed Nov. 25, 2024", 34 pgs.

"U.S. Appl. No. 17/010,501, Non Final Office Action mailed Apr. 21, 2023", 29 pgs.

"U.S. Appl. No. 17/010,501, Non Final Office Action mailed May 15, 2024", 29 pgs.

"U.S. Appl. No. 17/010,501, Response filed Feb. 2, 2024 to Final Office Action mailed Oct. 2, 2023", 13 pgs.

"U.S. Appl. No. 17/010,501, Response filed Jul. 21, 2023 to Non Final Office Action mailed Apr. 21, 2023", 14 pgs.

"U.S. Appl. No. 17/010,501, Response filed Sep. 16, 2024 to Non Final Office Action mailed May 15, 2024", 12 pgs.

"U.S. Appl. No. 17/732,949, Notice of Allowance mailed Jun. 20, 2024", 10 pgs.

"U.S. Appl. No. 17/751,397, 312 Amendment filed Jan. 14, 2025", 8 pgs.

"U.S. Appl. No. 17/751,397, Non Final Office Action mailed Jul. 10, 2024", 10 pgs.

"U.S. Appl. No. 17/751,397, Notice of Allowance mailed Oct. 17, 2024", 5 pgs.

"U.S. Appl. No. 17/751,397, PTO Response to Rule 312 Communication mailed Jan. 22, 2025", 2 pgs.

"U.S. Appl. No. 17/751,397, Response filed Oct. 1, 2024 to Non Final Office Action mailed Jul. 10, 2024", 8 pgs.

"Saliency Maps in Tensorflow 2.0", UR Machine Learning Blog, Data Scientist at City of Edmonton, [Online]. Retrieved from the Internet: <URL: https://usmanr149.github.io/urmlblog/cnn/2020/05/01/Salincy-Maps.html>, (May 1, 2020), 3 pgs.

"Watrix Technology", Biometric Update, [Online]. Retrieved from the Internet: <URL: https://www.biometricupdate.com/companies/watrix-technology>, (Accessed Jul. 17, 2023), 4 pgs.

Alguliyev, Rasim M, et al., "Privacy-preserving deep learning algorithm for big personal data analysis", Journal of Industrial Information Integration, 15, (Sep. 2019), 1-14.

Balle, B., et al., "Improving the gaussian mechanism for differential privacy: Analytical calibration and optimal denoising", in International Conference on Machine Learning PMLR, (Jul. 2018), pp. 394-403.

Barbaro, Michael, et al., "A Face Is Exposed for AOL Searcher No. 4417749.", The New York Times, [Online]. Retrieved from the Internet: <URL: https://www.nytimes.com/2006/08/09/technology/09aol.html>, (Aug. 9, 2006), 4 pgs.

Baumer, F. S, et al., "Privacy matters: detecting nocuous patient data exposure in online physician reviews", in International Conference on Information and Software Technologies. Springer, Cham, (Oct. 2017), 77-89.

Bo, H., et al., "ER-AE: Differentially Private Text Generation for Authorship Anonymization", in Proceedings of the 2021 Conference of the North American Chapter of the Association for Computational Linguistics: Human Language Technologies, (2021), 3997-4007.

Bowman, S., et al., "Generating Sentences from a Continuous Space", in Proceedings of the 20th SIGNLL Conference on Computational Natural Language Learning, (Aug. 2016), pp. 10-21.

Chen, Xiao, et al., "Distributed Generation of Privacy Preserving Data with User Customization", arXiv:1904.09415v1, (2019), 20 pgs.

Cresswell, Antonia, et al., "Inverting the Generator of a Generative Adversarial Network", arXiv:1802.05701v1, [Online]. Retrieved from the Internet: <URL: https://arxiv.org/pdf/1802.05701.pdf>, (2018), 8 pgs.

De Montjoye, Yves Alexandre, et al., "Unique in the crowd: The privacy bounds of human mobility", Scientific reports, 3(1), (Mar. 25, 2013), 1-5.

Doersch, C., et al., "Tutorial on variational autoencoders", arXiv preprint arXiv:1606.05908, (2016), 23 pgs.

Dwork, C., et al., "Calibrating noise to sensitivity in private data analysis", in Proceedings of the Third Conference on Theory of Cryptography, ser. TCC'06. Berlin, Heidelberg: Springer-Verlag, [Online] Retrieved from the internet: <http://dx.doi.org/10.1007/1168187814>, (2006), 265-284.

Fabien, M, et al., "BertAA: BERT fine-tuning for Authorship Attribution", in Proceedings of the 17th International Conference on Natural Language Processing (ICON), (Dec. 2020), 127-137.

Fernandes, N., et al., "Generalised differential privacy for text document processing", in International Conference on Principles of Security and Trust. Springer, Cham., (Apr. 2019), 123-148.

Feyisetan, O Feyisetan, et al., "Privacy and utility preserving textual analysis via calibrated multivariate perturbations.", in Proceedings of the 13th International Conference on Web Search and Data Mining, (Jan. 2020), 10 pgs.

Feyisetan, O., et al., "Leveraging hierarchical representations for preserving privacy and utility in text", in IEEE International Conference on Data Mining (ICDM), (2019), pp. 210-219.

Figurnov, M., et al., "Implicit Reparameterization Gradients", Advances in Neural Information Processing Systems, 31, (2018), 17 pgs.

Galer, Susan, "SAP Medical Research Insights receives Red Dot Award", SAP News Center (in German with English translation), [Online]. Retrieved from the Internet: <URL: https://news.sap.com/germany/2015/11/sap-medical-research-insights-erhalt-red-dot-award/>, (Nov. 23, 2015), 11 pgs.

Galer, Susan, "SAP Wins Red Dot Award", [Online]. Retrieved from the Internet: <URL: https://news.sap.com/2015/11/sap-medical-research-insights-wins-red-dot-award/>, (2015), 5 pgs.

Hern, Alex, "Fitness tracking app strava gives away location of secret US army bases", The Guardian, [Online]. Retrieved from the Internet: <URL: https://www.theguardian.com/world/2018/jan/28/fitness-tracking-app-gives-away-location-of-secret-us-army-bases.>, (2018), 4 pgs.

Huddleston, Tom Jr., "Can you get sued over a negative Yelp review?", Retrieved from the internet: <https://www.cnbc.com/2019/10/10/can-you-get-sued-over-a-negativeyelp-review.html>, (2019), 7 pgs.

Jawurek, Marek, et al., "Smart metering de-pseudonymization", in Proceedings of the 27th annual computer security applications conference, (Dec. 2011), 227-236.

John, V., et al., "Disentangled representation learning for non-parallel text style transfer", arXiv preprint arXiv:1808.04339, 11 pgs.

Karlsson, Stefan, et al., "QuickREST: Property-based Test Generation of OpenAPI-Described RESTful APIs", arXiv:1912.09686v1, (Dec. 20, 2019), 11 pgs.

Kim, Jayoung, et al., "Wearable Biosensors for healthcare monitoring", Nature Biotechnology, [Online]. Retrieved from the Internet: <URL: https://www.researchgate.net/publication/331329696_Wearable_biosensors_for_healthcare_monitoring>, (2019), 18 pgs.

Kingma, D. P, et al., "An introduction to variational autoencoders", arXiv preprint arXiv:1906.02691, (2019), 89 pgs.

Kingma, D. P., et al., "Auto-encoding variational bayes", arXiv preprint arXiv:1312.6114, (2013), 14 pgs.

Kwapisz, Jennifer, et al., "Activity Recognition using Cell Phone Accelerometers", Sensor, KDD, [Online]. Retrieved from the Internet: <URL: https://www.researchgate.net/publication/220520200_Activity_Recognition_Using_Cell_Phone_Accelerometers>, (2010), 9 pgs.

(56) References Cited

OTHER PUBLICATIONS

Laforest, Frederique, "WWW '22: Proceedings of the ACM Web Conference", Retrieved from the internet: <https://doi.org/10.1145/3485447.3512232>, (Apr. 25, 2022), 11 pgs.

Ma, Yue, et al., "Long Short-Term Memory Autoencoder Neural Networks Based DC Pulsed Load Monitoring Using Short-Time Fourier Transform Feature Extraction", IEEE 29th International Symposium on Industrial Electronics (ISIE), (Jun. 2020), 912-917.

Mahmood, A., et al., "A Girl Has No Name: Automated Authorship Obfuscation using Mutant-X", Proc. Priv. Enhancing Technol., (4), (2019), 54-71.

Majumder, Sumit, et al., "Smartphone sensors for health monitoring and diagnosis.", Sensors, 19, (2019), 45 pgs.

Malekzadeh, Mohammad, et al., "Replacement AutoEncoder: A Privacy-Preserving Algorithm for Sensory Data Analysis", arXiv:1710.06564v3, (2018), 12 pgs.

McDonald, A W, et al., "Use fewer instances of the letter i: Toward writing style anonymization", in International Symposium on Privacy Enhancing Technologies Symposium. Springer, Berlin, Heidelberg pp. 299-318, (Jul. 2012), 2 pgs.

Mironov, I., "Renyi Differential Privacy", in 2017 IEEE 30th computer security foundations symposium (CSF), pp. 263-275, (2017), 1-13.

Narayanan, Arvind, et al., "Robust De-anonymization of Large Sparse Datasets", IEEE Symposium on Security and Privacy, (2008), 111-125.

Newsham, Jack, "A Bad Glassdoor Review Led to a $1 Million Lawsuit", Retrieved from the internet: <https://www.businessinsider.com/bad-glassdoor-reddit-review-led-toa-1-million-lawsuit-2021-8>, (2021).

Rao, J. R, "Can pseudonymity really guarantee privacy?", in 9th USENIX Security Symgosium (USENIX Security 2000), (2000), 13 pgs.

Resnick, P., et al., "Trust among Strangers in Internet Transactions: Empirical Analyses of eBay's Reputation System", in The Economics of the Internet and E-commerce. Emerald Group Publishing Limited, (2002), 1-26.

Rezende, Danilo Jimenez, et al., "Stochastic Backpropagation and Approximate Inference in Deep Generative Models", Proceedings of the 31 st International Conference on MachineLearning, Beijing, China, JMLR: W&CP vol. 32, (2014), 9 pgs.

Rhodes, D, "Author attribution with cnns", Available online: <https://www.semanticscholar.org/paper/Author-Attribution-with-Cnn-s-Rhodes/0a904f9d6b47dfc574f681f4d3b41bd840871b6f/pdf> (accessed on Aug. 22, 2016)., (2015).

Romanov, A., et al., "Adversarial decomposition of text representation", arXiv preprint arXiv:1808.09042, (2018), 11 pgs.

Schaub, A, et al., "A trustless privacy-preserving reputation system", in IFIP International Conference on ICT Systems Security and Privacy Protection. Springer, Cham, (May 2016), 398-411.

Seshadri, Dhruv, et al., "Wearable sensors for monitoring the internal and external workload of the athlete", npj Digit. Med. 2, 71, [Online]. Retrieved from the Internet: <URL: https://www.nature.com/articles/s41746-019-0149-2.pdf>, (2019), 18 pgs.

Shetty, R., et al., "Author Attribute Anonymity by Adversarial Training of Neural Machine Translation", in 27th USENIX Security Symposium (USENIX Security 18), (2018), 1633-1650.

Shrestha, P, et al., "Convolutional Neural Networks for Authorship Attribution of Short Texts", in EACL (2), (Apr. 2017), 669-674.

Smith, A. F, "Factors influencing employee intentions to provide honest upward feedback ratings", Journal of Business and Psychology, 22(3), (2008), 191-207.

Stamatatos, E, "A survey of modern authorship attribution methods", Journal of the American Society for information Science and Technology, 60(3), (2009), 538-556.

Voynov, Andrey, et al., "Unsupervised Discovery of Interpretable Directions in the GAN Latent Space", arXiv:2002.03754, (2020), 15 pgs.

Weggenmann, B, "SynTF: Synthetic and differentially private term frequency vectors for privacy-preserving text mining", in the 41st International ACM SIGIR Conference on Research & Development in Information Retrieval, (Jun. 2018), 305-314.

Yousefi-Azar, et al., "Autoencoder-based Feature Learning for Cyber Security Applications", (2017), 8 pgs.

Zhao, Shengjia, et al., "InfoVAE: Information maximizing variational autoencoders.", arXiv:1706.02262v1, (2017), 11 pgs.

Zhou, et al., "Human Activity Recognition Based on Improved Bayesian Convolution Network to Analyze Health Care Data Using Wearable IoT Device", IEEE Access, vol. 8, (Apr. 2020), 1-8.

\* cited by examiner

DATA OBSCURING FOR NATURAL LANGUAGE TEXT

BACKGROUND

The Internet includes many online platforms that allow users to share reviews of various products and/or services. The availability of such reviews not only helps prospective customers, patients, or employees to make informed decisions, but also allows business owners to analyze provided feedback and gain insights on how their products, services, or brand image can be improved.

BRIEF DESCRIPTION OF DRAWINGS

The present disclosure is illustrated by way of example and not limitation in the following figures.

DETAILED DESCRIPTION

Figure 1:
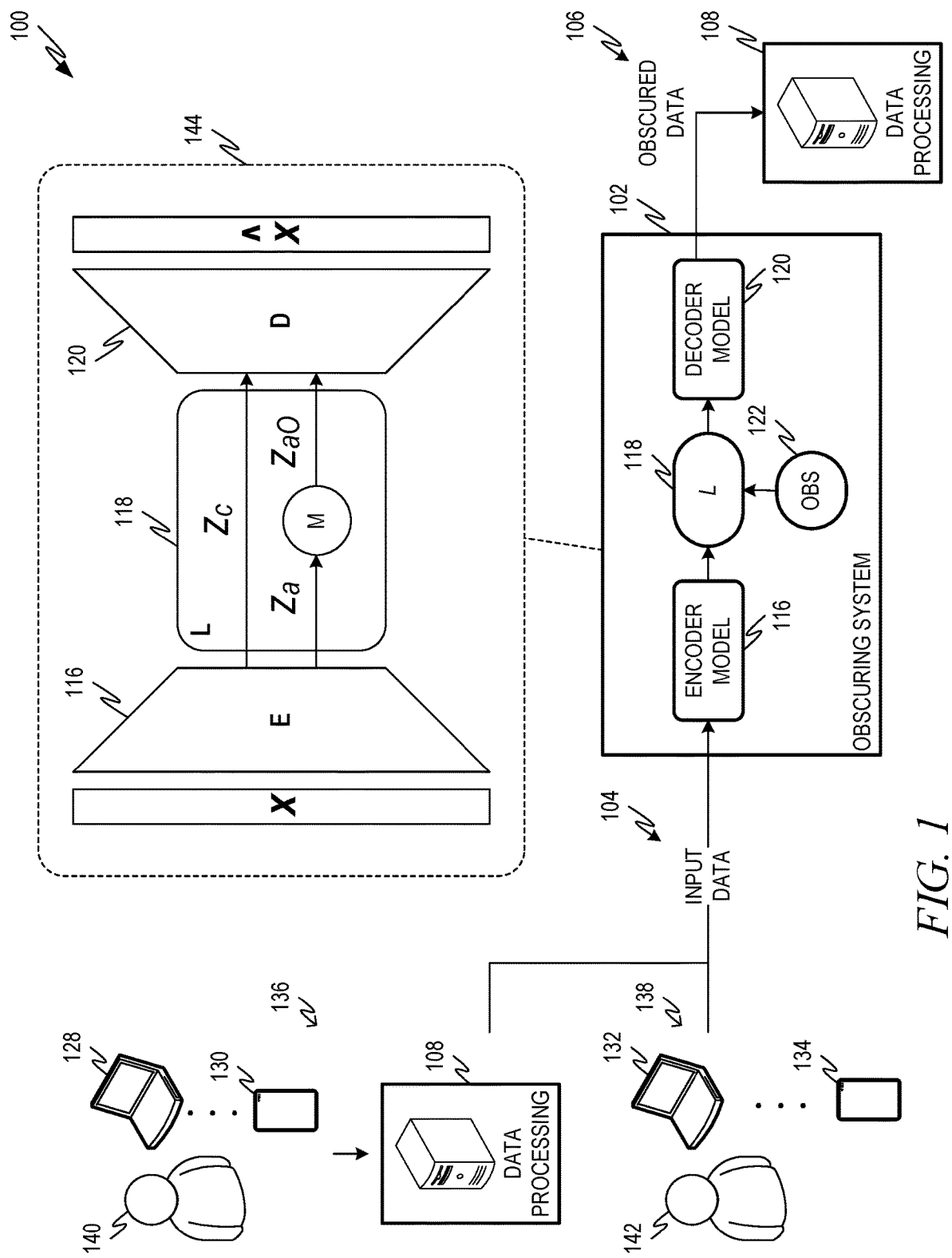
FIG. 1 is a diagram showing one example of an environment for implementing an autoencoder arrangement to obscure natural language text data.

There are many situations in computing environments where it is desirable for a user to provide natural language text anonymously. For example, when a user provides a review of a product or service, it may be desirable for the user to maintain anonymity. This may allow the user to provide honest feedback without fear of retaliatory action from the proprietor of the product or service being reviewed. In another example, a user may wish to provide feedback regarding a medical provider without disclosing the user's identity so as to avoid disclosing confidential health data.

Many computer-implemented web solutions include an option to allow users to submit natural language text anonymously. That is, a user may submit natural language text without providing other identifying information such as, for example the user's name, address, and/or the like. The absence of explicit identifying information, however, may not be enough to provide users with true anonymity. This is because, in many scenarios, a user may be identified from natural language text using metadata and or other features of the natural language text itself. Even a user's writing style may be sufficient to de-anonymize them using authorship attribution techniques.

Some examples address these challenges by applying a differential privacy technique to natural language text units. Various difficulties arise when applying differential privacy techniques to natural language text units, however. For example, many differential privacy solutions operate on a word-by-word basis. For example, differential privacy techniques may only be suitable to generate output data having the same length (e.g., the same number of words) as the input natural language text data. Also, some existing differential privacy techniques may not return human-readable language. For example, output-obscured data generated by some differential privacy systems may involve obscuring individual words differently. This may result in text that does not make sense to a human user.

Various examples address these and other challenges by obscuring natural language data using a computer-implemented autoencoder. An autoencoder arrangement comprises an encoder model and a decoder model. The encoder model is trained to receive input natural language data and generate a latent space representation of the natural language data. The natural language data may include a sequence of tokens, where the tokens represent words, syllables, characters, special subword encodings (e.g., Byte-Pair Encoding) and/or the like. The latent space representation of the natural language text data may be transformed back to natural language text by the decoder model. Using an autoencoder arrangement to transform a unit of input data to a latent space and then back to a feature space is sometimes referred to as inference.

Some examples described herein disentangle author features from content features in the latent space. Author features may include properties of the natural language text that may tend to identify the author of the text. This can include, for example, word sequencing, word selections, sentence length, and/or the like. Content features may describe the content or meaning of the natural language text. Consider an example product review on an e-commerce website. Content features describing the example product review may include, for example, a sentiment of the review, an indication of whether the review was positive or negative, a rating given to the product, and/or the like. Author features describing the example product review may include word selections, word sequencing, sentence length, and/or the like.

In some examples, a computer-implemented autoencoder may be configured to disentangle author features and content features in the latent space. This may result in one or more author latent vectors and one or more content latent vectors. Author latent vectors may include one or more vectors in the latent space describing author features for natural language text. Content latent vectors may include one or more vectors in the latent space describing content features of the natural language text. The author latent vector or vectors may be modified in the latent space to generate modified author latent vectors. The decoder may operate on the content latent vectors and the modified author latent vectors to generate obscured natural language data corresponding to the input natural language data. The obscured natural language data may maintain the content or meaning of the input natural language data while obscuring author features. In this way, the content of the natural language may be preserved while also reducing the risk that the author will be identified from the natural language text.

In some examples, an autoencoder arrangement, such as a variational autoencoder (VAE), may be used to implement differential privacy with respect to natural language text. In some examples, differential privacy constraints may be placed on one or more latent space vectors making up a latent space representation of the input natural language data. This may result in one or more constrained latent space vectors. The decoder may operate on the constrained latent space vectors to generate obscured natural language text data.

Also, in some examples a VAE may be used to implement differential privacy while also disentangling author features and content-related features in the latent space. For example, one or more differential privacy parameters may be placed on the one or more author latent vectors describing the input natural language text data in the latent space. This may be in addition to, or instead of, modifying the one or more author latent vectors, as described herein. The decoder model may act on the constrained one or more author latent vectors. The content latent vector or vectors may be constrained or unconstrained, depending on the implementation.

FIG. 1 is a diagram showing one example of an environment 100 for implementing an autoencoder arrangement to obscure natural language text data. The environment 100 includes an obscuring system 102. The obscuring system 102 receives input data 104 and generates corresponding obscured data 106. The input data 104 may include natural language text data. Units of natural language text data may include, for example, a plurality of sequenced tokens. The tokens making up natural language text data may be arranged according to a particular sequence.

The obscured data 106 is provided to a data processing system 108. The data processing system 108 uses the obscured data 106 to perform various tasks, as described herein. In some examples, the obscured data 106 includes reviews of products and/or services that may be published to an Internet-accessible source, such as a webpage or the like. Relative to the input data 104, the obscured data 106 may omit data or data patterns that identify an author of the input data. In this way, the obscured data 106 may maintain the meaning of the input data 104 while obscuring the identity of the author.

The obscuring system 102 receives the input data 104 from one or more input data sources 136, 138 and generates obscured data 106. The example input data sources 136, 138 include the data processing system 108 and/or a user computing device 132, 134 of a user 142. Users 140, 142 may generate natural language text via one or more user computing devices 128, 130, 132, 134. User computing devices 128, 130, 132, 134 may include any suitable type of computing device such as, for example, a laptop computer, a tablet computer, a mobile computing device, a desktop computer, and/or the like.

In some examples, a user 140 may generate natural language text data via one or more user computing devices 128, 130 and provide the natural language text directly to the data processing system 108. For example, the data processing system 108 may be a web server or other suitable computing device for publishing natural language text data provided by one or more users, such as the user 140. The data processing system 108, for example prior to publishing the received natural language text data, may provide the natural language text data to the obscuring system 102. The data processing system 108 may receive obscured data 106 from the obscuring system 102 and may publish the obscured data 106.

In another example arrangement, a user 142 may generate natural language text data via one or more computing devices 132, 134 and provide the generated natural text data to the obscuring system 102. When the obscuring system 102 has created obscured data 106, it may provide the obscured data 106 to the data processing system 108. The data processing system 108 may, in some examples, publish the obscured data 106.

The obscuring system 102, in some examples, comprises one or more computing devices that are distinct from the user computing devices 128, 130, 132, 134 and/or from the data processing system 108. In other examples, the obscuring system 102 is implemented by the one or more of the user computing devices 128, 130, 132, 134 and/or by the data processing system 108. For example, some or all of the obscuring system 102 may execute at a processor of the user computing device 128, 130, 132, 134 and/or at a processor of the data processing system 108.

The obscuring system 102 implements an autoencoder arrangement which may be arranged to perform an inference operation. For example, an encoder model 116 may receive the input data 104 and generate a corresponding representation of the input data 104 in latent space 118. The representation of the input data 104 in the latent space 118 may include, for example, one or more vectors in the latent space 118. As described herein, the conversion of the input data 104 to a latent space representation may be a lossy operation. For example, the latent space 118 may have a smaller dimensionality than the input data 104. The autoencoder arrangement may be implemented as a Variational Autoencoder (VAE). Also, in some examples, the decoder model 120 may be implemented as a Generative Adversarial Network (GAN) or GAN-like generative model with the encoder model 116 being the inverse of the GAN or GAN-like generative model implementing the decoder model 120. Obscuring data 122 may be added to the latent space representation of the input data 104.

FIG. 1 shows a breakout window 144 including a representation of the operation of the encoder model 116 and decoder model 120 acting on an example unit x of input data. The input data unit x may be natural language text data including, as described herein, a sequence of tokens. The input data unit x is initially a feature space representation that may be described by different input data unit features, such as author features and content-related features. The encoder model 116 acts on the input data unit to generate a latent space representation z of the input data unit x in the latent space 118. In the example of capital FIG. 1, the latent space representation z of the input data unit x includes a content latent vector ($z_c$) and an author latent vector ($z_a$). The content latent vector $z_c$ may describe content features of the input data unit x while the author latent vector $z_a$ may describe author features of the input data unit x. In this example, the author latent vector $z_a$ is modified at M to generate an obscured author latent vector $z_{aO}$. The content latent vector $z_c$ and the obscured author latent vector $z_{aO}$ are provided to the decoder model 120, which may generate obscured natural language data $\hat{x}$.

Various examples described herein may utilize variational autoencoders (VAEs). A VAE may model an actual data distribution p(x) as a generative random process through a parameterized family of distributions $p_\theta(x)$, where x is the unit of input data, as given by Equation [1] below:

$$p(x) \approx p_\theta(x) = \int_z p_\theta(x|z) p_\theta(z) dz \quad [1]$$

In this example, x may be a sequence of discrete tokens as described herein. The latent space representation z may represent the input data unit x in the latent space 118. The decoder model 120 may conditionally generate x with likelihood $p_\theta(x|z)$ based on a latent space representation z. The latent space representation z may follow a prior distribution $p_\theta(z)$. The VAE may be configured to learn the parameters $\theta$ from training data.

The encoder model 116 may implement a recognition function $q_\phi(z|x)$, that approximates a posterior $p_\theta(z|x)$. Training the VAE may include jointly optimizing the parameters $\theta$ of the decoder model 120 and the parameters $\phi$ of the encoder model 116 to simultaneously maximize the log likelihood of the data log $p_\theta(x)$ and minimize the KL divergence to $q_\phi(z|x)$ from $p_\theta(z|x)$. In some examples this can be achieved by maximizing the evidence lower bound (ELBO) as given by Equation [2] below:

$$L(x) = \log p_\theta(x) - D_{KL}(q_\phi(z|x) \| p_\theta(z|x)) = E_{q_\phi(z|x)}[\log p_\theta(x|z)] - D_{KL}(q_\phi(z|x) \| p_\theta(z)) \qquad [2]$$

In some examples, a VAE may be implemented utilizing neural networks to build the end encoder model 116 and the decoder model 120. For example, neural networks may be used to derive the immediate parameters for the conditional distributions. The encoder model 116, for example, may be implemented using an encoder network $E_\phi(x)$ to parameterize the approximate posterior $p_\theta(z|x)$. The decoder model 120, for example, may be implemented using a decoder network $G_\theta(z)$ to determine the parameters of the likelihood $p_\theta(x|z)$.

Consider an example neural network implementation of a VAE using a Gaussian distribution. In this example, the posterior $p_\theta(z|x)$ may roughly follow a Gaussian distribution with diagonal covariance. The encoder model 116, then, may model the approximate posterior as given by Equation [3] below:

$$q_\phi(z|x) = \mathcal{N}(z; \mu, \text{diag}(\sigma^2)) \qquad [3]$$

in this example, the encoder model 116 may determine the distribution parameters from input data 104 (represented by x), as given by Equation [4] below:

$$\mu, \sigma = E_\phi(x) = (\mu(x), \sigma(x)) \qquad [4]$$

In this example, the latent space representation z may be a vector sampled from the distribution, for example, as given by equation [5] below:

$$z \sim \mathcal{N}(\mu(x), \text{diag}(\sigma^2(x))) \qquad [5]$$

In the decoder model 120, the prior of the latent variable z may be a standard Gaussian without further parameterization as given by Equation [6] below:

$$p_\theta(z) = \mathcal{N}(z; 0, I) \qquad [6]$$

The conditional likelihood $p_\theta(x|z)$, determined by a decoder network $G_\theta(z)$ of the decoder model 120, may model the probability of the input data x based on the latent variable z. In examples where the input data x is natural language text data, the input data x may be represented as a sequence of discrete tokens, where each token may represent a word, a syllable, a character, or the like over a vocabulary or alphabet, which may be predefined. In the equations herein, the vocabulary of the input data is represented by $\mathcal{V}$. A representation of input data x including a sequence of discrete tokens is given by Expression [7] below:

$$x = (x_1, x_2, \ldots, x_n) \qquad [7]$$

In some examples, the chain rule may be used to consider conditional probabilities of a token or word $x_t$ given the previous word $x_{<t}$, for example, as shown by Equation [8] below:

$$p_\theta(x|z) = \prod_{t=1}^{n} p_\theta(x_t | z, x_{<t}) \qquad [8]$$

in Equation [8], conditionals may be modeled as categorical distributions, for example as described by Equation [9] below:

$$p_\theta(x_t | z, x_{<t}) = \text{Cat}(x_t; \mathcal{V}, p_t) \qquad [9]$$

The probability vectors $p_t$ over the vocabulary $\mathcal{V}$ may be determined at each position $t = 1, \ldots, n$ based on the latent vector z and the previously decoded tokens $x_{<t}$, as given by Equation [10] below:

$$p_t = G_\theta(z, x_{<t}) \qquad [10]$$

In various examples, a VAE, such as a VAE implementing the end autoencoder arrangement of FIG. 1, may be trained to compute the gradients and minimize the ELBO. Various techniques may be used including, for example, stochastic gradient descent (SGD) and/or a derived method with backpropagation. Equation [11] below shows an example training condition for a VAE implementation of the end autoencoder arrangement of FIG. 1:

$$\mathcal{L}_{VAE} := -L(x) = E_{q_\phi(z|x)}[-\log p_\theta(x|z)] + D_{KL}(q_\phi(z|x) \| p_\theta(z)). \qquad [11]$$

In Equation [11], the second term with the KL divergence is called the KL loss. In an example using a standard Gaussian prior and a diagonal Gaussian approximate posterior, the KL loss may be computed analytically as shown by Equation [12] below:

$$\mathcal{L}_{KL}(x) := D_{KL}(q_\phi(z|x) \| p_\theta(z)) = \frac{1}{2} \sum_{i}^{L} (\sigma_i^2 + \mu_i^2 - \log \sigma_i^2 - 1) \qquad [12]$$

The first term of equation [11] is a reconstruction loss, and may be expressed as shown by Equation [13] below:

$$\mathcal{L}_{rec}(x) := E_{q_\phi(z|x)}[-\log p_\theta(x|z)] \approx -\log p_\theta(x|z) \qquad [13]$$

The expectation of the reconstruction loss may be approximated with a Monte Carlo estimator using a single latent sample $z \sim q_\phi(z|x)$. Applying a negative log likelihood (NLL), then, a sequence of tokens such as expressed by Expression [7] above, may be expanded using the chain rule described above to provide Equation [14] below:

$$-\log p_\theta(x|z) = -\sum_{t=1}^{n} \log p_\theta(x_t | z, x_{<t}), \qquad [14]$$

The Equation [14] may coincide with the categorical cross entropy loss aggregated over the entire sequence of tokens. In examples utilizing the Monte Carlo sampling step, because the reconstruction loss is approximated, it may not be differentiable. Accordingly, in some examples, gradients for backpropagation may be obtained using reparameterization, such as implicit reparameterization.

A unit x of input data 104, represented by x, may be run through the encoder model 116, represented by $E_\phi$, to obtain parameters for an approximate posterior $q_\phi(z|x)$. A sample $z \sim q_\phi(z|x)$ may be drawn from the approximate posterior. The sample z, which may be a latent representation of the unit of input data x may be passed to the decoder model 120, represented by $G_\theta$, which may reconstruct an output $\hat{x} \sim p_\theta$ (x|z). In the case of sequential data such as natural language text data, a full output sequence $\hat{x}=(\hat{x}_1, \ldots, \hat{x}_m)$ may be constructed iteratively by sampling subsequent tokens as indicated by Equation [15] using the next work probability vector $p_t$ as described herein, until a designated end-of-sequence token, maximum length, or other indication of the end of the sequence of tokens is reached.

$$\hat{x}_t \sim \text{Cat}(\mathcal{V}, G_\theta(z, x_{<t})) \qquad [15]$$

It will be appreciated that different variations may be utilized to implement the autoencoder arrangement of FIG. 1. In some examples, the end encoder model 116 comprises an embedding layer that transforms discrete tokens of a unit of input data to numerical embedding vectors, which may be processed in subsequent layers to produce the parameters for the distributions of the approximate posteriors $q_\theta(z|x)$. Example parameters may include a distribution mean $\mu$ and a distribution variance $\sigma^2$.

Also, in some examples the decoder model 120 may comprise one or more neural network layers. In some examples, the decoder model 120 is invoked iteratively and produces a distribution over the output vocabulary, from which the next output token $\hat{x}_t$ is inferred, for example, in a manner that depends on the latent representation of the input data unit as well as on previous tokens $\hat{x}_1, \ldots, \hat{x}_{t-1}$ generated by previous iterations. In various examples, other iterative strategies can be used. For example, a greedy search may be used, where a greedy search may take the next token with the highest probability $\hat{x}_t = \arg\max_x \text{Cat}(x_t; \mathcal{V}, p_t)$. Also, in some examples a beam search may be used in which the encoder model 116 codes multiple sequences simultaneously while keeping track of the most likely sequences, for example, using a Top-K or Top-p sampling approach. Also, in some examples in which the output length of the obscured data is known in advance, the decoder model 120 may produce the entire output sequence $\hat{x}$ of the obscured data at once, non-iteratively.

Various different types of neural networks and neural network layer types may be used to implement the encoder model 116 and/or the decoder model 120. Examples include recurrent neural networks (RNNs) such as gated recurrent units (GRUs) or long short-term memory (LSTM) cells, convolutional layers (CNN), fully connected/dense layers, layers consisting of Transformer blocks, and/or the like. The number of layers, the type of layers, and associated parameters such as number of cells, dimensionality, kernel sizes, and/or the like may vary by implementation.

Figure 2:
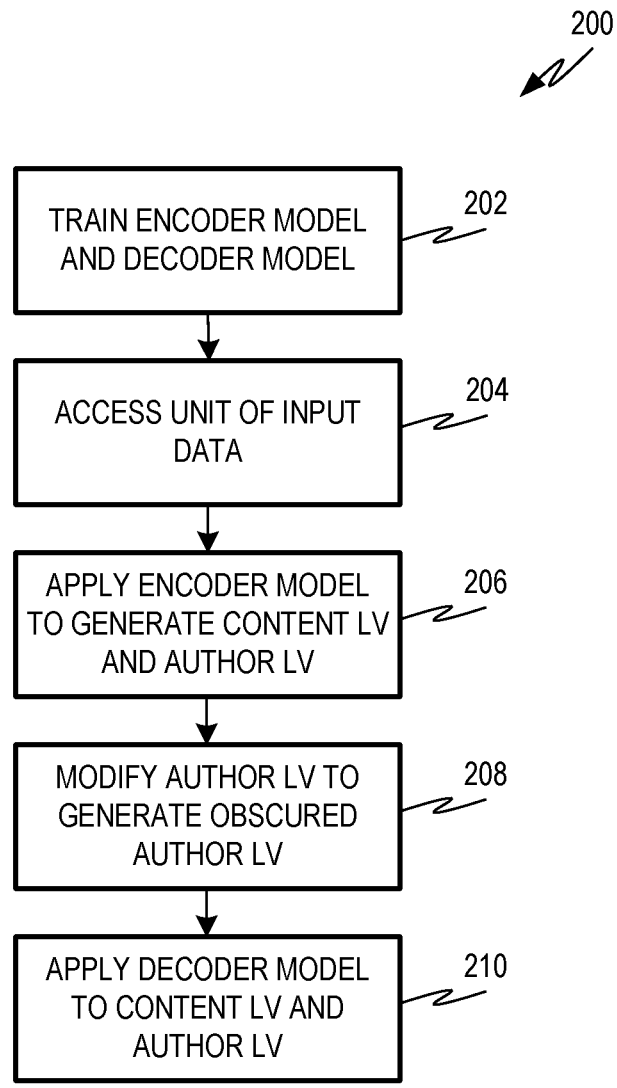
FIG. 2 is a flow chart showing one example of a process flow that may be executed in the environment of FIG. 1 to obscure natural language text data.

FIG. 2 is a flow chart showing one example of a process flow 200 that may be executed in the environment 100 to obscure natural language text data. At operation 202, the obscuring system 102, or another suitable system, may train the encoder model 116 and the decoder model 120. The encoder model 116 and decoder model 120 may be trained using training data that may include, for example, natural language text units comprising a plurality of sequenced tokens. The training data may be provided to the encoder model 116, which may generate a latent space representation of the training data. The decoder model 120 may act on the latent space representation of the training data to re-create the training data in the future space. Modifications may be made to the parameters of the encoder model 116 and or the decoder model 120 to train the respective models 116, 120 to accurately re-create the training data. Any suitable training technique may be used such as, for example SGD or another method with backpropagation as described herein.

At operation 204, the obscuring system 102 accesses at least one unit of input data. The unit of input data may be natural language text data comprising a plurality of sequenced tokens, for example, as described herein. The unit of input data accessed at operation 204 may be received from various different system such as, for example, one or more of the user computing devices 128, 130, 132, 134, the data processing system 108, and/or the like.

At operation 206, the obscuring system applies the encoder model 116 to the unit of input data to generate a latent space representation of the unit of input data. In some examples, the latent space representation may be or include one or more latent vectors, as described herein. The latent space vectors may include a content latent vector and an author latent vector. The content latent vector may describe, in the latent space, one or more features of the unit of input data describing content. The author latent vector may describe, in the latent space, one or more features of the unit of input data describing the author.

At operation 208, the obscuring system 102 may modify the author latent vector to generate an obscured author latent vector. The obscuring system 102 may modify the author latent vector in various different ways. In some examples, the obscuring system 102 may set the obscured author latent vector equal to zero. Also, in some examples, the obscuring system 102 may set the author latent vector to an average value of the mean of the prior distribution for a current batch of input data 104. An example of such an arrangement is given by Equation [16] below:

$$z_a = \frac{1}{|\mathcal{B}|} \sum_{x_i \in \mathcal{B}} \mu_a(x_i), \qquad [16]$$

In Equation [16], the batch of input data 104 is indicated by $\mathcal{B}$ and may include input data units $x_1$-$x_n$. In another example, the obscuring system 102 may select the obscured author latent vector by randomly sampling the prior distribution, for example, as given by equation [17] below:

$$z_a \sim \mathcal{N}(0, I) \qquad [17]$$

At operation 210, the obscuring system 102 applies the decoder model 120 to the content latent vector and to the obscured author latent vector. This may result in an obscured data unit $\hat{x}$.

Figure 3:
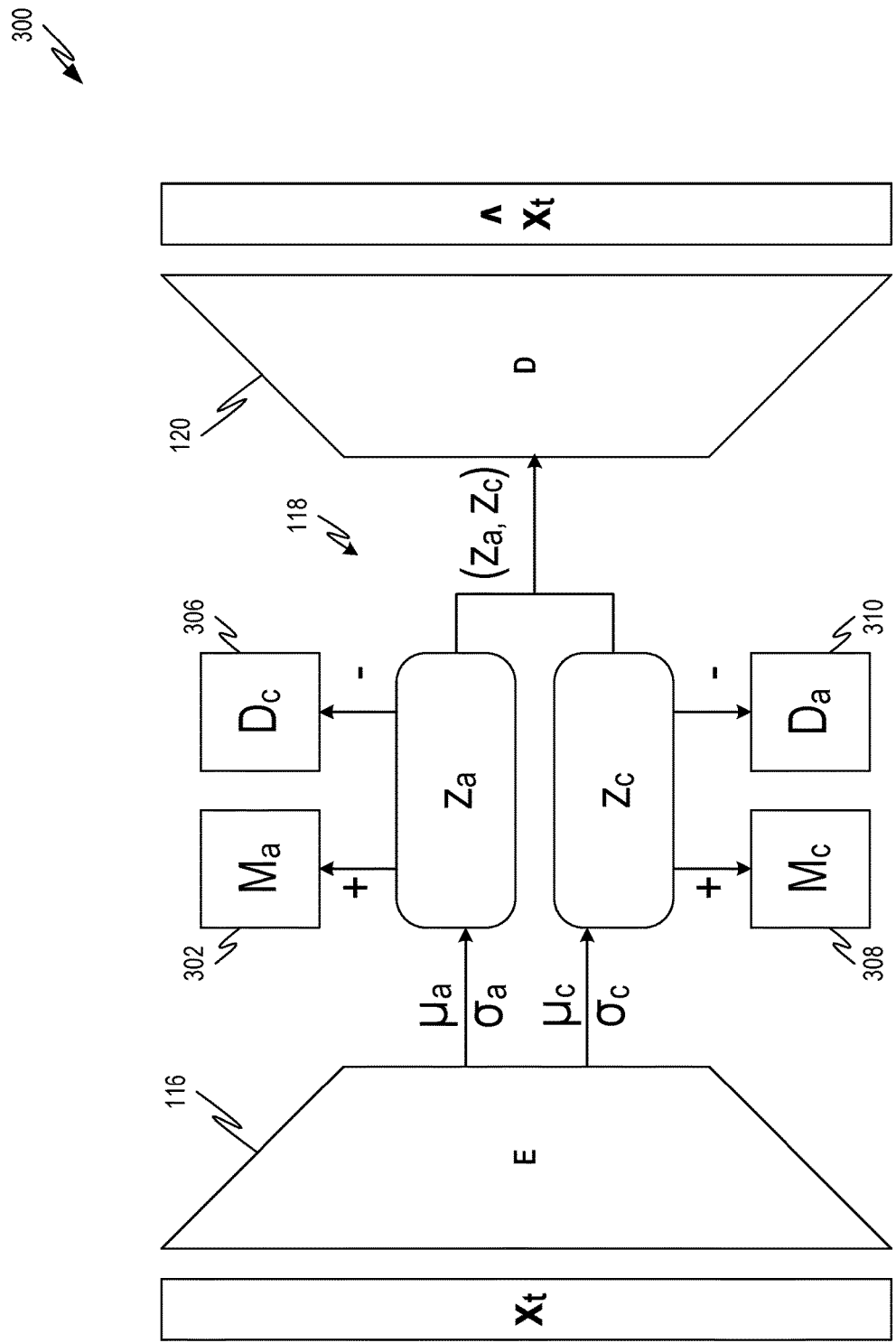
FIG. 3 is a diagram showing a representation of the autoencoder arrangement of FIG. 1 to demonstrate a technique for disentangling author features and content-related features.

FIG. 3 is a diagram showing a representation 300 of the autoencoder arrangement of FIG. 1 to demonstrate a technique for disentangling author features and content-related features. FIG. 3 shows the encoder model 116 and the decoder model 120. In this example, the encoder model 116 and the decoder model 120 may have previously been trained, for example as described herein. The encoder model 116 may receive a unit of training data $x_t$. The unit of training data $x_t$ may be natural language text data comprising a plurality of sequenced tokens. The unit of training data $x_t$ may also be labeled. For example, the unit of training data $x_t$ may be associated with labeled data including labels indicating an identity of the author and/or one or more content features. The content features may include, for example, a sentiment. In examples in which the unit of training data $x_t$ is a review of a product or service, it may be labeled with content features such as, for example, a rating provided to the product or service, a sentiment value indicating whether the review was positive or negative, and/or the like.

The encoder model 116 may generate a latent space representation of the unit of training data $x_t$. In this example, the latent space representation generated by the encoder model 116 may include an author prior distribution and a content prior distribution. The author prior distribution may be represented by an author mean $\mu_a$ and an author variance $\sigma_a^2$. The content prior distribution may be described by a content mean $\mu_c$ and a content variance $\sigma_c^2$. The obscuring system 102 may be programmed to select an author latent vector $z_a$ from the author prior distribution and a content latent vector $z_c$ from the content prior distribution, for example as described herein with respect to Equation [5].

In the example of FIG. 3, classifier models are used to train the encoder model 116 and decoder model 120 to disentangle author features from content features. A content motivator model 308 may determine predicted content features for the unit of training data $x_t$ based on the content latent vector $z_c$. The content motivator model 308 may be any suitable classifier model that is trained, for example based on the training data, to identify values for one or more content features describing said unit of training data $x_t$ from the content latent vector $z_c$.

In some examples, the content motivator model 308 utilizes a vocabulary of content indicating words and is trained to predict a Bag-of-Words (BOW) distribution $p_b$ of the unit of training data $x_t$. The content motivator model 308 may be trained to generate a predicted BOW distribution $\hat{p}_b$ for the unit of training data $x_t$ from the content latent vector $z_c$. In some examples, the content motivator model-predicted distribution $\hat{p}_b$ may be, for example, as provided by Equation [18] below:

$$\hat{p}_b = M_c(z_c) = \text{softmax}(W_{M_c} * z_c + b_{M_c}). \qquad [18]$$

A content motivating loss describes a difference between the actual values for the features of the unit of training data $x_t$ and the values predicted by the content motivator model 308. The content motivating loss $\mathcal{L}_{M_c}$, then, may be described by the cross-entropy between the actual BOW distribution $p_b$ and the predicted BOW distribution $\hat{p}_b$, which may be given by Equation [19] below:

$$\mathcal{L}_{M_c} = -\sum_{w \in \mathcal{V}_c} p_b(w) \log(\hat{p}_b(w)). \qquad [19]$$

An author motivator model 302 may generate a motivator-predicted identity of the author of the unit of training data $x_t$ based on the author latent vector $z_a$. The author motivator model 302 may be any suitable classifier model that is trained, for example based on the training data, to identify the author of a unit of input data from its corresponding author latent vector $z_a$. When the author latent vector $z_a$ is provided to the author motivator model 302, the author motivator model 302 may produce a predicted author of the unit of training data $x_t$. The author motivator model-predicted author $\hat{p}_a$ may be described by Equation [20] below:

$$\hat{p}_a = M_a(z_a) = \text{softmax}(W_{M_a} * z_a + b_{M_a}) \qquad [20]$$

An author motivator loss may be a difference between the actual author of the unit of training data $x_t$ and the motivator model-predicted author $\hat{p}_a$, for example, as given by equation [21] below:

$$\mathcal{L}_{M_a} = -\sum_{u \in \mathcal{A}} p_a(u) \log(\hat{p}_a(u)) \qquad [21]$$

A content discriminator model 306 and an author discriminator model 310 may attempt to predict the content feature values and author, respectively, of the unit of training data $x_t$ from the opposite latent vector. For example, the content discriminator model 306 may generate discriminator-predicted content features for the unit of training data $x_t$ from the author latent vector $z_a$. In some examples, the content discriminator model 306 may operate in a manner similar to that of the content motivator model 308 albeit while receiving the author latent vector $z_a$ as input instead of the content latent vector $z_c$. For example, the content discriminator model 306 may predict a distribution of the content features based on the author latent vector $z_a$. A content discriminating loss $\mathcal{L}_{D_c}$ may be found, for example, in a manner similar to that described above with respect to Equation [19].

The author discriminator model 310 may determine a discriminator-predicted author $p_a$ from the content latent vector $z_c$. For example, the author discriminator model 310 may operate in a manner similar to that of the author motivator model 302. Similarly, an error $\mathcal{L}_{D_a}$ of the author discriminator model 310 may be found in a manner similar to that shown with respect to Equation [21] above.

A total error for the arrangement may be a sum of the motivator errors minus a sum of the discriminator errors, for example, as given by Equation [22] below:

$$\mathcal{L}_{ovr} = \mathcal{L}_{VAE} + \lambda_{M_c} \cdot \mathcal{L}_{M_c} + \lambda_{M_a} \cdot \mathcal{L}_{M_a} - \lambda_{D_c} \cdot \mathcal{L}_{D_c} - \lambda_{D_a} \cdot \mathcal{L}_{D_a} \qquad [22]$$

In the example of Equation [22], the values $\lambda_{M_c}$, $\lambda_{M_a}$, $\lambda_{D_c}$, and $\lambda_{D_a}$ are weights that may be applied to the respective losses, for example, depending on the implementation. The total error illustrated by the Equation [22] may be used to modify parameters of the encoder model 116 and or decoder model 120 so that the encoder model 116 and the decoder model 120 can more accurately generate the author latent vector $z_a$ and the content latent vector $z_c$. The process described may be executed for a desirable number of epochs, where each epoch may involve providing a unit of training data $z_a$ to the encoder model 116, generating latent vectors $z_a$, $z_c$, as described herein, and modifying parameters of the encoder model 116 and/or the decoder model 120 based on the resulting total error.

As illustrated by the Equation [22], the training loss used to train the encoder model 116 and decoder model 120 may reward the models 116, 120 when the errors of the motivator models 302, 308 are small and punish the models 116, 120 when the errors of the motivator models 302, 308 are relatively high. Similarly, the encoder model 116 and decoder model 120 may be rewarded when the errors of the discriminator models 306, 310 are high and punished when the errors of the discriminator models 306, 310 are low. In this way, the encoder model 116 and decoder model 120 may be trained to generate an author latent vector $z_a$ that indicates the identity of the author and does not indicate content features and to generate a content latent vector $z_c$ that indicates the values of the content features and does not indicate the identity of the author.

Figure 4:
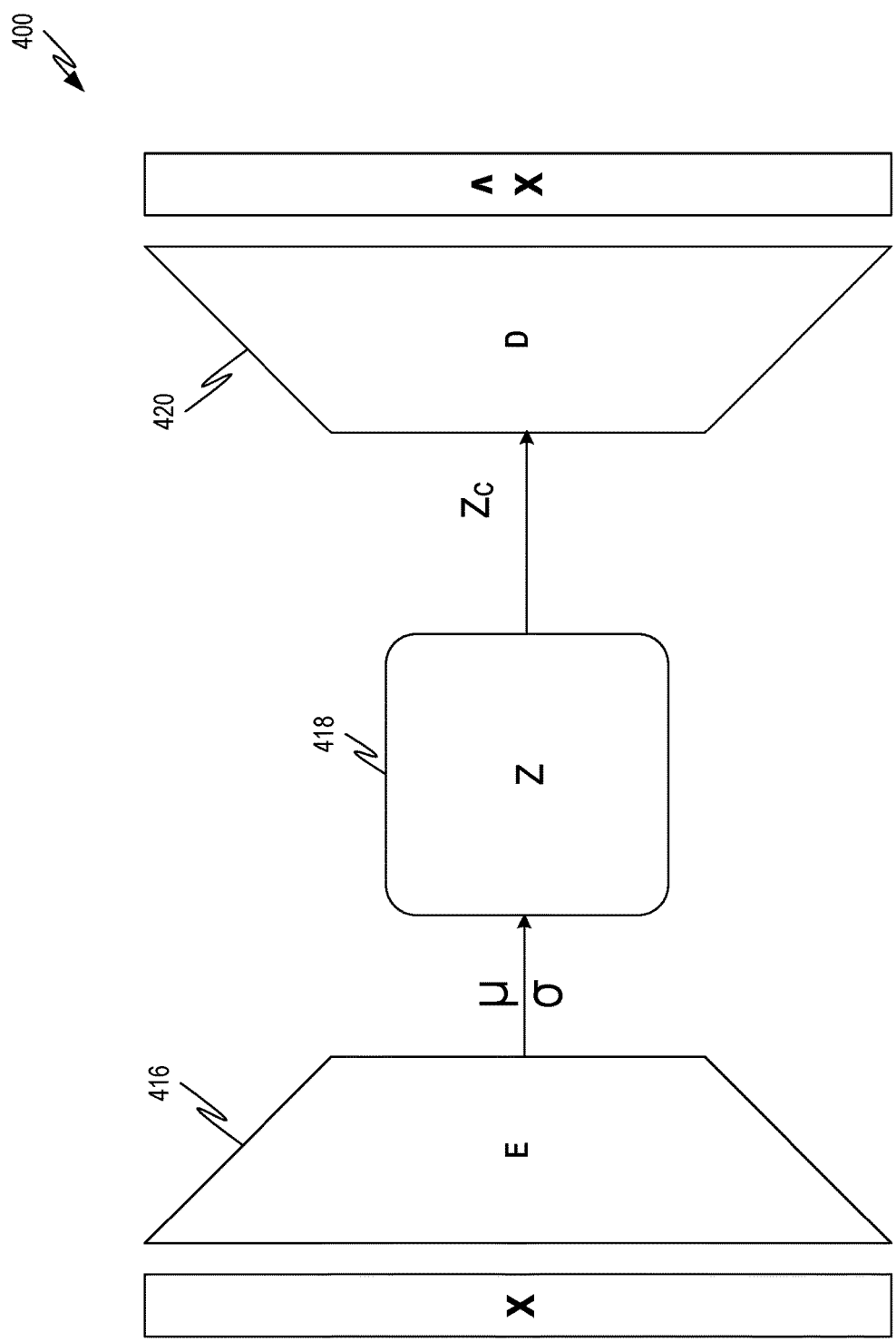
FIG. 4 is a diagram showing one example of an autoencoder arrangement that may be executed by the obscuring system to apply differential privacy to natural language text data.

FIG. 4 is a diagram showing one example of an autoencoder arrangement 400 that may be executed by the obscuring system 102 to apply differential privacy to natural language text data. Differential privacy may be implemented by obscuring data to meet a constraint or condition. Consider the differential privacy condition given by Equation [23] below:

$$S \subset \text{Range}(M), \Pr[M(X_1) \in S] \leq \exp(\epsilon) \times \Pr[M(X_2) \in S] + \delta \qquad [23]$$

In Equation [23], M is a randomized function. M is ($\epsilon$, $\delta$)-differentially private if it meets the differential privacy condition given by Equation [23]. In Equation [23] $X_1$ and $X_2$ are sets of observed data differing on, at most, one data item. $M(X_1)$ and $M(X_2)$ are the output of random noise applied to the observed data sets $X_1$ and $X_2$. S is a value in the set of all possible outputs of M. The value δ is the probability of failure (for example, the probability that the difference between $X_1$ and $X_2$ is detectable).

The value ε is the privacy parameter and may also be referred to as a privacy budget. For example, the privacy budget ε may describe the maximum permissible difference between a query on the observed data and a query on the observed data adding or removing one entry. The privacy budget can also describe the amount of random noise that is added to data set $X_1$, such that it cannot be discerned from the observed data set adding or removing one entry $X_2$. A lower privacy budget (e.g., a smaller permissible difference between the observed data set $X_1$ and the observed data set adding or removing one entry $X_2$) implies a higher level of random noise added to the observed data set $X_1$.

As the privacy budget ε decreases, the output of the differential privacy mechanism becomes more private. For example, as the privacy budget ε is reduced, the difference between the observed data $X_1$ and the obscured data after the application of random noise $M(X_1)$ increases. This makes the obscured data more private, but also decreases the usefulness of the resulting data to a computing system. For example, as differences between the observed data $X_1$ and the obscured data $M(X_1)$ increase, the accuracy and/or usefulness of a resulting software application may also decrease.

In various examples, differential privacy may be implemented in the autoencoder arrangement 400 of FIG. 4 by applying constraints to the prior distribution generated by an encoder model 416. For example, the encoder model 416 may receive a unit of input data x and generate a prior distribution, as described herein. A latent vector z in latent space 418 may be selected from the prior distribution, as described herein. The decoder model 420 may convert from the latent space 418 back to the feature space to generate obscured natural language data x̂.

The latent vector z in the latent space 418, in some examples, may be constrained to achieve differential privacy. For example, a continuous mean bound may be applied to the prior distribution mean described by μ in the latent space 418. An example continuous mean bound that may be applied to the prior distribution mean μ is given by Equation [24] below:

$$\tanh * (\mu) := \tanh(\|\mu\|) \frac{\mu}{\|\mu\|} \quad [24]$$

In some examples, applying the mean bound described by equation [24] may constrain the mean vector μ of the prior distribution to light inside a unit ball about the origin. In some examples, the co-domain of the function tanh* may be multiplied by a desired radius R to constrain the prior distribution to a ball to the desired radius. In some examples, the latent vector z may be constrained to achieve differential privacy by setting the variance $\sigma^2$ of the prior distribution equal to a constant, such that it does not depend on the unit of input data x. In this example, the latent vector z may be selected from a prior distribution generated by the encoder model 416, yet subject to one or more of the conditions described herein.

Figure 5:
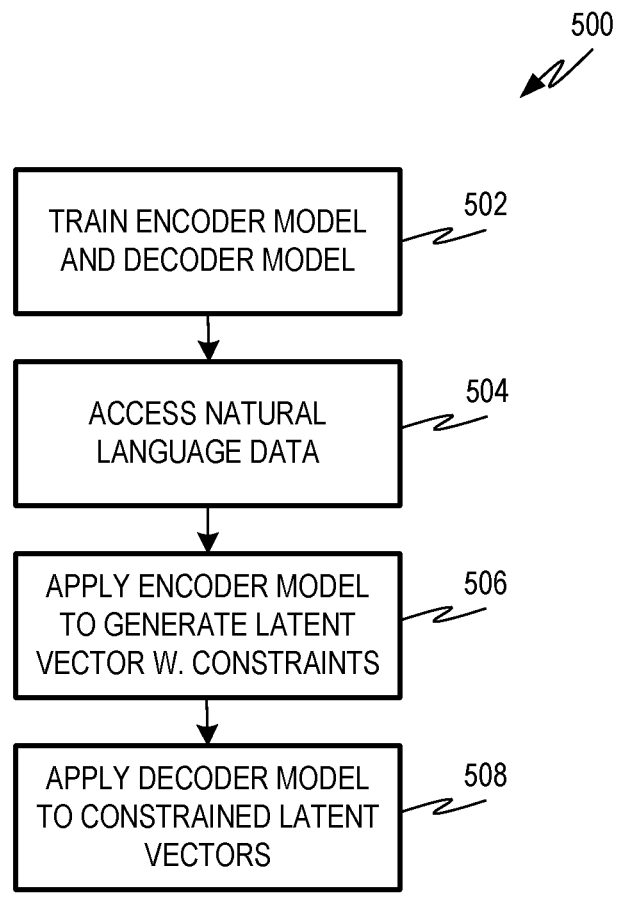
FIG. 5 is a flow chart showing one example of a process flow that may be executed by the obscuring system of FIG. 1 to apply differential privacy to natural language text data utilizing an autoencoder arrangement.

FIG. 5 is a flow chart showing one example of a process flow 500 that may be executed by the obscuring system 102 to apply differential privacy to natural language text data utilizing an autoencoder arrangement. At operation 502, the obscuring system 102, or another suitable system, may train the encoder model 416 and the decoder model 420. The encoder model 416 and decoder model 420 may be trained using training data that may include, for example, natural language text units comprising a plurality of sequenced tokens. The training data may be provided to the encoder model 416, which may generate a latent space representation of the training data, such as the latent vector z. The decoder model 420 may act on the latent space representation of the training data to re-create the training data in the future space. Modifications may be made to the parameters of the encoder model 416 and or the decoder model 420 train the respective models 416, 420 to accurately re-create the training data. Any suitable training technique may be used such as, for example SGD or another method with backpropagation as described herein.

At operation 504, the obscuring system 102 accesses at least one unit of input data. The unit of input data may be natural language text data comprising a plurality of sequenced tokens, for example, as described herein. The unit of input data accessed at operation 504 may be received from various different systems such as, for example, one or more of the user computing devices 128, 130, 132, 134, the data processing system 108, and/or the like.

At operation 506, the obscuring system 102 applies the encoder model 416 to the unit of input data to generate a latent space representation of the unit of input data, such as the latent vector z. The latent vector z may be generated according to the constraints described with respect to FIG. 4 in order to achieve differential privacy. At operation 508, the obscuring system 102 applies the decoder model 420 to the latent vector z generated using differential privacy constraints, for example, as described herein. The result may be obscured natural language data x̂.

Figure 6:
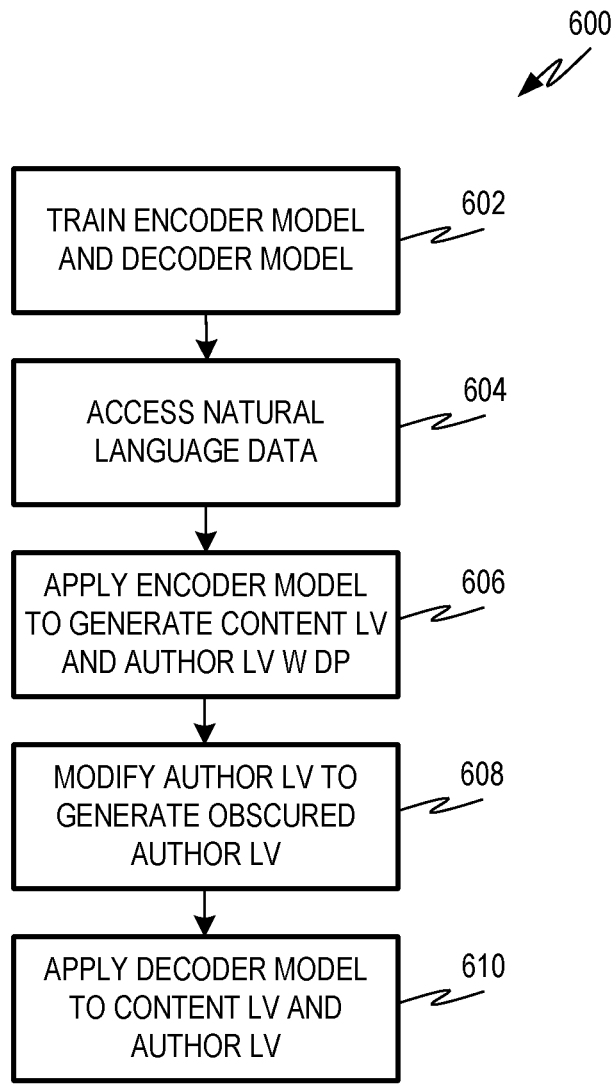
FIG. 6 is a flow chart showing one example of a process flow that may be executed, for example, in the environment of FIG. 1, to obscure natural language text data in a differentially private manner.

In some examples, the privacy constraints, such as those described herein with respect to FIG. 4, may be applied in an autoencoder arrangement that disentangles author and content features, similar to that described herein with respect to FIGS. 1-3. FIG. 6 is a flow chart showing one example of a process flow 600 that may be executed, for example, in the environment 100 of FIG. 1, to obscure natural language text data in a differentially private manner.

At operation 602, the obscuring system 102, or another suitable system, may train the encoder model 116 and the decoder model 120. The encoder model 116 and decoder model 120 may be trained using training data that may include, for example, natural language text units comprising a plurality of sequenced tokens. The training data may be provided to the encoder model 116, which may generate a latent space representation of the training data. The decoder model 120 may act on the latent space representation of the training data to re-create the training data in the future space. Modifications may be made to the parameters of the encoder model 116 and or the decoder model 120 train the respective models 116, 120 to accurately re-create the training data. Any suitable training technique may be used such as, for example SGD or another method with backpropagation as described herein.

At operation 604, the obscuring system 102 accesses at least one unit of input data. The unit of input data may be natural language text data comprising a plurality of sequenced tokens, for example, as described herein. The unit of input data accessed at operation 604 may be received from various different systems such as, for example, one or more of the user computing devices 128, 130, 132, 134, the data processing system 108, and/or the like.

At operation 606, the obscuring system applies the encoder model 116 to the unit of input data to generate a latent space representation of the unit of input data. In some examples, the latent space representation may be or include one or more latent vectors, as described herein. The latent space vectors may include a content latent vector and an author latent vector. In some examples the latent space vectors generated at operation 606 may be generated while applying one or more differential privacy constraints. For example, the encoder model 116 may generate an author prior distribution and a content prior distribution as described herein. Differential privacy constraints, such as those described with respect to FIG. 4, may be applied to the author prior distribution in order to generate a constrained author latent vector $z_a$. In some examples, differential privacy constraints may be applied to both the author prior distribution and to the content prior distribution to generate a constrained content latent vector $z_c$.

At operation 608, the obscuring system 102 may modify the author latent vector, as described herein, to generated obscured author latent vector. The operation 608 may be applied to the author latent vector generated according to the one or more differential privacy constraints as described herein. At operation 610, the obscuring system 102 may apply the decoder model 120 to the obscured author latent vector $z_a$ and to the content latent vector $z_c$. The result may be obscured natural language data $\hat{x}$ that may also be differentially private.

EXAMPLES

Example 1 is a computer system for obscuring natural language data, the system comprising: at least one processor programmed to perform operations comprising: accessing natural language data, the natural language data comprising a first plurality of sequenced tokens; applying an encoder model to the first plurality of sequenced tokens to generate a latent space representation of the first plurality of sequenced tokens, the latent space representation comprising a first content latent vector describing a content of the natural language data and a first author latent vector describing an author of the natural language data; modifying the first author latent vector to generate an obscured author latent vector; and applying a decoder model to the first content latent vector and the obscured author latent vector to generate obscured natural language data, the obscured natural language data comprising a second plurality of sequenced tokens.

In Example 2, the subject matter of Example 1 optionally includes the operations further comprising: accessing a training data unit, the training data unit comprising a training plurality of sequenced tokens; accessing label data, the label data describing an author of the training data unit; using the encoder model to generate an author latent vector for the training data unit; applying an author motivator model to the author latent vector for the training data unit to generate a motivator-predicted author of the training data unit; and modifying the encoder model based on an author motivator loss describing a difference between the motivator-predicted author and the author.

In Example 3, the subject matter of Example 2 optionally includes the label data also describing a content value, the content value describing a content feature of the training data unit the operations further comprising applying a content discriminator model to the author latent vector to generate a discriminator-predicted content value, the modifying of the encoder model also being based on a content discriminator loss describing a difference between the discriminator-predicted content value and the content value.

In Example 4, the subject matter of any one or more of Examples 2-3 optionally includes the operations further comprising: using the encoder model to generate a content latent vector for the training data unit; and applying a content motivator model to the content latent vector to generate a motivator-predicted content value, the modifying of the encoder model also being based on a content motivator loss describing a difference between the motivator-predicted content value and the content value.

In Example 5, the subject matter of Example 4 optionally includes the operations further comprising applying an author discriminator model to the content latent vector to generate a discriminator-predicted author, the modifying of the encoder model also being based on an author discriminator loss describing a difference between the discriminator-predicted author and the author.

In Example 6, the subject matter of any one or more of Examples 1-5 optionally includes the modifying of the first author latent vector comprising setting the first author latent vector equal to zero.

In Example 7, the subject matter of any one or more of Examples 1-6 optionally includes the modifying of the first author latent vector comprising setting the first author latent vector equal to a mean author latent vector for a batch of natural language data comprising multiple pluralities of tokens from the natural language data.

In Example 8, the subject matter of any one or more of Examples 1-7 optionally includes the first author latent vector comprising a latent distribution mean vector and a latent distribution variance vector, the generating of latent space representation of the first plurality of sequenced tokens comprising applying a mean bound to the latent distribution mean vector to generate a bounded latent distribution mean vector.

In Example 9, the subject matter of Example 8 optionally includes the operations further comprising setting the latent distribution variance vector to a constant, the obscured author latent vector being based at least in part on the bounded latent distribution mean vector and the constant latent distribution variance vector.

In Example 10, the subject matter of any one or more of Examples 8-9 optionally includes the mean bound comprising a unit ball about an origin, the bounded latent distribution mean vector being within the unit ball.

Example 11 is a computer-implemented method to obscure natural language data, comprising: accessing natural language data, the natural language data comprising a first plurality of sequenced tokens; applying an encoder model to the first plurality of sequenced tokens to generate a latent space representation of the first plurality of sequenced tokens, the latent space representation comprising a first content latent vector describing a content of the natural language data and a first author latent vector describing an author of the natural language data; modifying the first author latent vector to generate an obscured author latent vector; and applying a decoder model to the first content latent vector and the obscured author latent vector to generate obscured natural language data, the obscured natural language data comprising a second plurality of sequenced tokens.

In Example 12, the subject matter of Example 11 optionally includes accessing a training data unit, the training data unit comprising a training plurality of sequenced tokens; accessing label data, the label data describing an author of the training data unit; using the encoder model to generate an author latent vector for the training data unit; applying an author motivator model to the author latent vector for the training data unit to generate a motivator-predicted author of the training data unit; and modifying the encoder model based on an author motivator loss describing a difference between the motivator-predicted author and the author.

In Example 13, the subject matter of Example 12 optionally includes the label data also describing a content value, the content value describing a content feature of the training data unit further comprising applying a content discriminator model to the author latent vector to generate a discriminator-predicted content value, the modifying of the encoder model also being based on a content discriminator loss describing a difference between the discriminator-predicted content value and the content value.

In Example 14, the subject matter of any one or more of Examples 12-13 optionally includes using the encoder model to generate a content latent vector for the training data unit; and applying a content motivator model to the content latent vector to generate a motivator-predicted content value, the modifying of the encoder model also being based on a content motivator loss describing a difference between the motivator-predicted content value and the content value.

In Example 15, the subject matter of Example 14 optionally includes applying an author discriminator model to the content latent vector to generate a discriminator-predicted author, the modifying of the encoder model also being based on an author discriminator loss describing a difference between the discriminator-predicted author and the author.

In Example 16, the subject matter of any one or more of Examples 11-15 optionally includes the modifying of the first author latent vector comprising setting the first author latent vector equal to zero.

In Example 17, the subject matter of any one or more of Examples 11-16 optionally includes the modifying of the first author latent vector comprising setting the first author latent vector equal to a mean author latent vector for a batch of natural language data comprising multiple pluralities of tokens from the natural language data.

In Example 18, the subject matter of any one or more of Examples 11-17 optionally includes the first author latent vector comprising a latent distribution mean vector and a latent distribution variance vector, the generating of latent space representation of the first plurality of sequenced tokens comprising applying a mean bound to the latent distribution mean vector to generate a bounded latent distribution mean vector.

In Example 19, the subject matter of Example 18 optionally includes setting the latent distribution variance vector to a constant, the obscured author latent vector being based at least in part on the bounded latent distribution mean vector and the constant latent distribution variance vector.

Example 20 is a non-transitory machine-readable medium comprising instructions thereon that, when executed by at least one processor, cause the at least one processor to perform operations comprising: accessing natural language data, the natural language data comprising a first plurality of sequenced tokens; applying an encoder model to the first plurality of sequenced tokens to generate a latent space representation of the first plurality of sequenced tokens, the latent space representation comprising a first content latent vector describing a content of the natural language data and a first author latent vector describing an author of the natural language data; modifying the first author latent vector to generate an obscured author latent vector; and applying a decoder model to the first content latent vector and the obscured author latent vector to generate obscured natural language data, the obscured natural language data comprising a second plurality of sequenced tokens.

Figure 7:
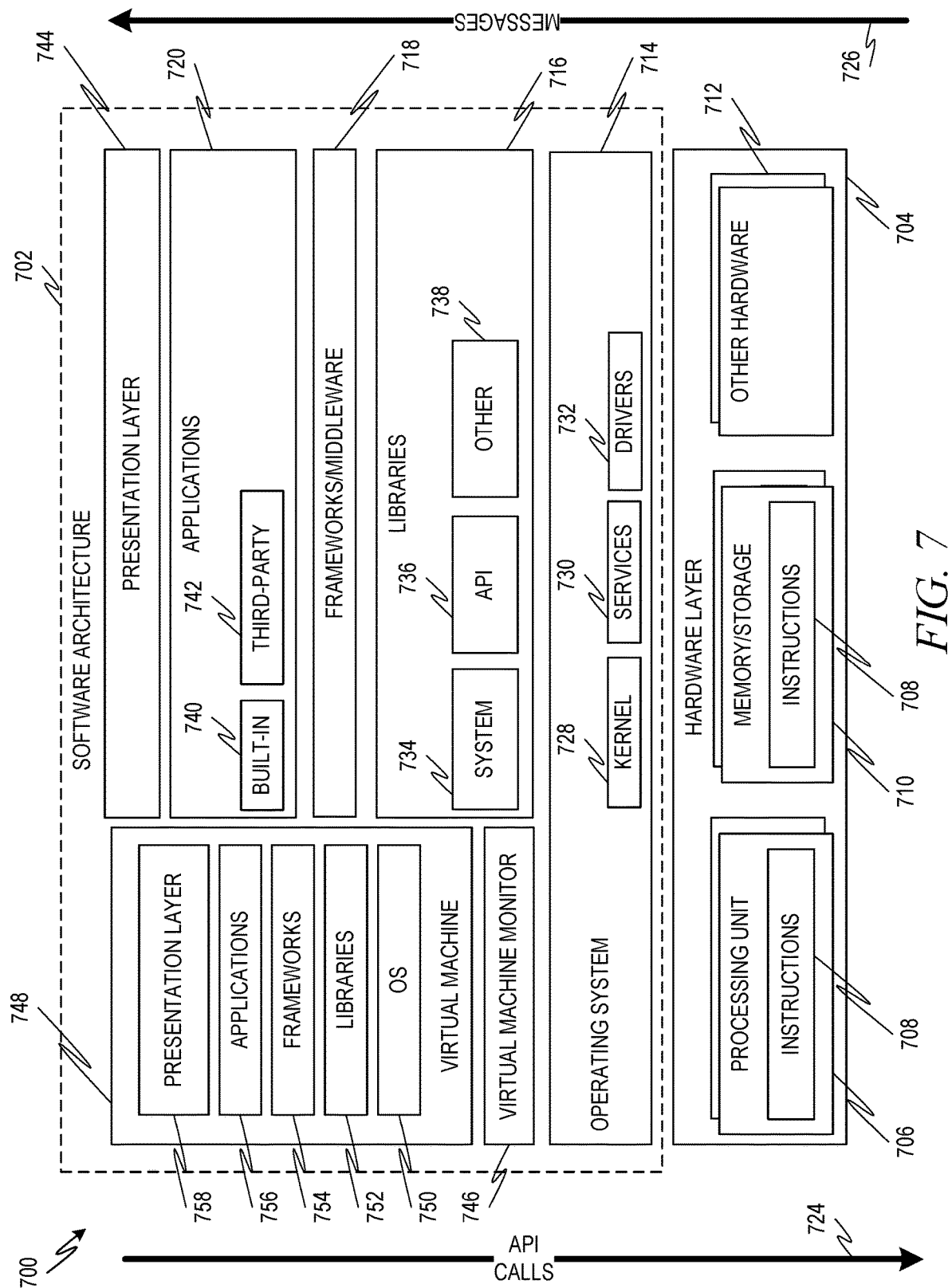
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture and many other architectures may be implemented to facilitate the functionality described herein. An example hardware layer 704 is illustrated and can represent, for example, any of the above referenced computing devices. In some examples, the hardware layer 704 may be implemented according to the architecture of the computer system of FIG. 7.

The hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the software architecture 702.

In the example architecture of FIG. 7, the software architecture 702 may be conceptualized as a stack of layers where each layer provides particular functionality. For example, the software architecture 702 may include layers such as an operating system 714, libraries 716, middleware 718, applications 720, and presentation layer 744. Operationally, the applications 720 and/or other components within the layers may invoke application programming interface (API) calls 724 through the software stack and access a response, returned values, and so forth illustrated as messages 726 in response to the API calls 724. The layers illustrated are representative in nature and not all software architectures have all layers. For example, some mobile or special purpose operating systems may not provide middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, Near Field Communication (NFC) drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the operating system 714 functionality (e.g., kernel 728, services 730 and/or drivers 732). The libraries 716 may include system libraries 734 (e.g., C standard library) that may provide functions such as memory allocation functions, token or token manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738, such as machine learning libraries, to provide many other APIs to the applications 720 and other software components/modules.

The middleware 718 (also sometimes referred to as a frameworks layer) may provide a higher-level common infrastructure that may be utilized by the applications 720 and/or other software components/modules. For example, the middleware 718 may provide various graphic user interface (GUI) functions, high-level resource management, high-level location services, and so forth. The middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system libraries 734, API libraries 736, and other libraries 738), middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 8:
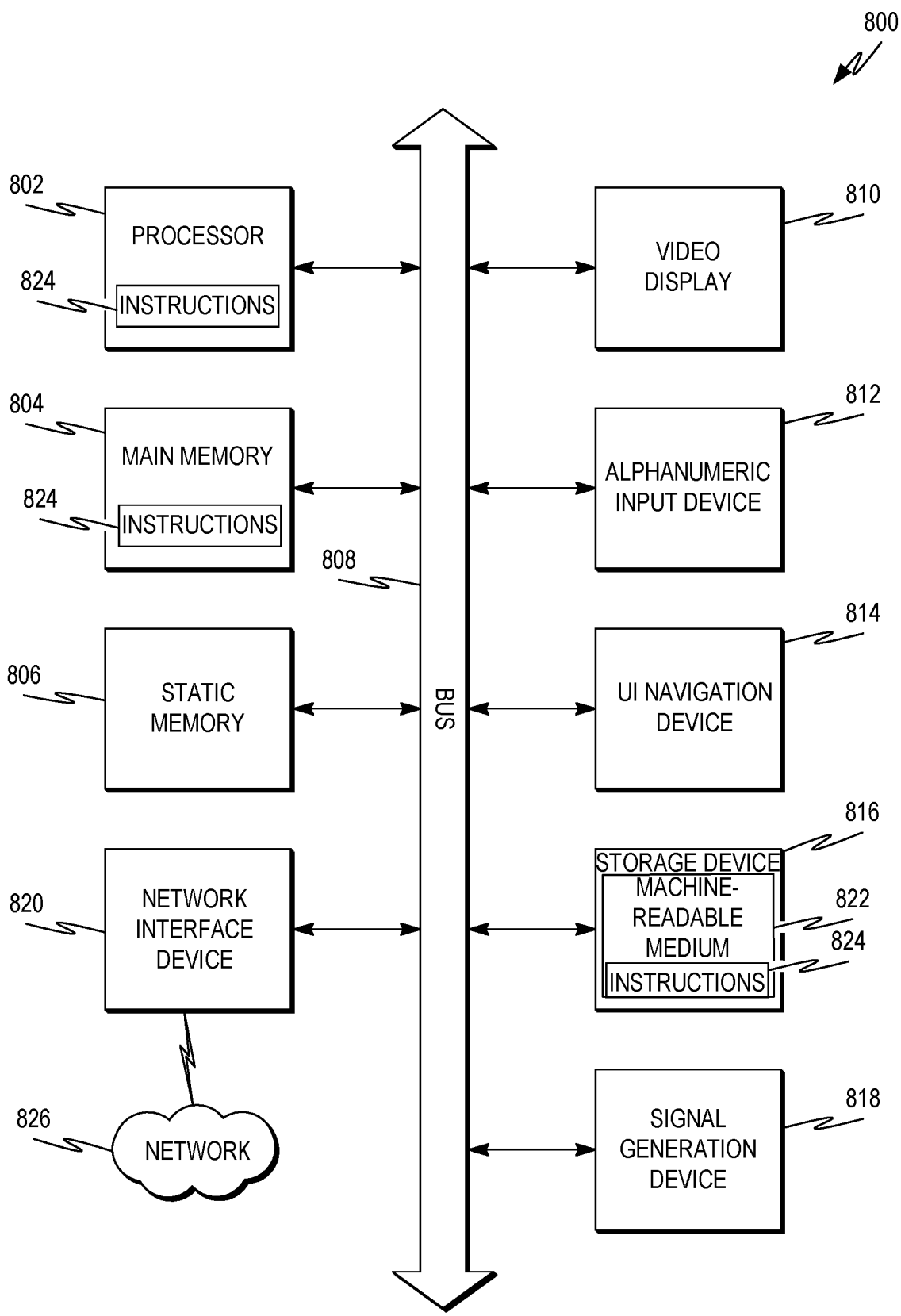
FIG. 8 is a block diagram of a machine in the example form of a computing system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. A machine-readable medium is not a transmission medium.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system for obscuring natural language data, the system comprising:
    at least one hardware processor programmed to perform operations comprising:
        accessing natural language data, the natural language data comprising a first plurality of sequenced tokens;
        applying an encoder model to the first plurality of sequenced tokens to generate a latent space representation of the first plurality of sequenced tokens, the latent space representation comprising a first content latent vector describing a content of the natural language data and a first author latent vector describing an author of the natural language data;
        modifying the first author latent vector to generate an obscured author latent vector; and
        applying a decoder model to the first content latent vector and the obscured author latent vector to generate obscured natural language data, the obscured natural language data comprising a second plurality of sequenced tokens.

2. The system of claim 1, the operations further comprising:
    accessing a training data unit, the training data unit comprising a training plurality of sequenced tokens;
    accessing label data, the label data describing an author of the training data unit;
    using the encoder model to generate an author latent vector for the training data unit;
    applying an author motivator model to the author latent vector for the training data unit to generate a motivator-predicted author of the training data unit; and
    modifying the encoder model based on an author motivator loss describing a difference between the motivator-predicted author and the author.

3. The system of claim 2, the label data also describing a content value, the content value describing a content feature of the training data unit the operations further comprising applying a content discriminator model to the author latent vector to generate a discriminator-predicted content value, the modifying of the encoder model also being based on a content discriminator loss describing a difference between the discriminator-predicted content value and the content value.

4. The system of claim 2, the operations further comprising:
using the encoder model to generate a content latent vector for the training data unit; and
applying a content motivator model to the content latent vector to generate a motivator-predicted content value, the modifying of the encoder model also being based on a content motivator loss describing a difference between the motivator-predicted content value and the content value.

5. The system of claim 4, the operations further comprising applying an author discriminator model to the content latent vector to generate a discriminator-predicted author, the modifying of the encoder model also being based on an author discriminator loss describing a difference between the discriminator-predicted author and the author.

6. The system of claim 1, the modifying of the first author latent vector comprising setting the first author latent vector equal to zero.

7. The system of claim 1, the modifying of the first author latent vector comprising setting the first author latent vector equal to a mean author latent vector for a batch of natural language data comprising multiple pluralities of tokens from the natural language data.

8. The system of claim 1, the first author latent vector comprising a latent distribution mean vector and a latent distribution variance vector, the generating of latent space representation of the first plurality of sequenced tokens comprising applying a mean bound to the latent distribution mean vector to generate a bounded latent distribution mean vector.

9. The system of claim 8, the operations further comprising setting the latent distribution variance vector to a constant, the obscured author latent vector being based at least in part on the bounded latent distribution mean vector and the constant latent distribution variance vector.

10. The system of claim 8, the mean bound comprising a unit ball about an origin, the bounded latent distribution mean vector being within the unit ball.

11. A computer-implemented method to obscure natural language data, comprising:
accessing, by at least one hardware processor, natural language data, the natural language data comprising a first plurality of sequenced tokens;
applying by the at least one hardware processor, an encoder model to the first plurality of sequenced tokens to generate a latent space representation of the first plurality of sequenced tokens, the latent space representation comprising a first content latent vector describing a content of the natural language data and a first author latent vector describing an author of the natural language data;
modifying, by the at least one hardware processor, the first author latent vector to generate an obscured author latent vector; and
applying, by the at least one hardware processor, a decoder model to the first content latent vector and the obscured author latent vector to generate obscured natural language data, the obscured natural language data comprising a second plurality of sequenced tokens.

12. The method of claim 11, further comprising:
accessing a training data unit, the training data unit comprising a training plurality of sequenced tokens;
accessing label data, the label data describing an author of the training data unit;
using the encoder model to generate an author latent vector for the training data unit;
applying an author motivator model to the author latent vector for the training data unit to generate a motivator-predicted author of the training data unit; and
modifying the encoder model based on an author motivator loss describing a difference between the motivator-predicted author and the author.

13. The method of claim 12, the label data also describing a content value, the content value describing a content feature of the training data unit further comprising applying a content discriminator model to the author latent vector to generate a discriminator-predicted content value, the modifying of the encoder model also being based on a content discriminator loss describing a difference between the discriminator-predicted content value and the content value.

14. The method of claim 12, further comprising:
using the encoder model to generate a content latent vector for the training data unit; and
applying a content motivator model to the content latent vector to generate a motivator-predicted content value, the modifying of the encoder model also being based on a content motivator loss describing a difference between the motivator-predicted content value and the content value.

15. The method of claim 14, further comprising applying an author discriminator model to the content latent vector to generate a discriminator-predicted author, the modifying of the encoder model also being based on an author discriminator loss describing a difference between the discriminator-predicted author and the author.

16. The method of claim 11, the modifying of the first author latent vector comprising setting the first author latent vector equal to zero.

17. The method of claim 11, the modifying of the first author latent vector comprising setting the first author latent vector equal to a mean author latent vector for a batch of natural language data comprising multiple pluralities of tokens from the natural language data.

18. The method of claim 11, the first author latent vector comprising a latent distribution mean vector and a latent distribution variance vector, the generating of latent space representation of the first plurality of sequenced tokens comprising applying a mean bound to the latent distribution mean vector to generate a bounded latent distribution mean vector.

19. The method of claim 18, further comprising setting the latent distribution variance vector to a constant, the obscured author latent vector being based at least in part on the bounded latent distribution mean vector and the constant latent distribution variance vector.

20. A non-transitory machine-readable medium comprising instructions thereon that, when executed by at least one processor, cause the at least one processor to perform operations comprising:
accessing natural language data, the natural language data comprising a first plurality of sequenced tokens;
applying an encoder model to the first plurality of sequenced tokens to generate a latent space representation of the first plurality of sequenced tokens, the latent space representation comprising a first content latent vector describing a content of the natural language data and a first author latent vector describing an author of the natural language data;

modifying the first author latent vector to generate an obscured author latent vector; and applying a decoder model to the first content latent vector and the obscured author latent vector to generate obscured natural language data, the obscured natural language data comprising a second plurality of sequenced tokens.

* * * * *